3,018,285
20-ETHYLENE DIOXY-PREGNANE-3-ONE DERIVATIVES

Howard J. Ringold and George Rosenkranz, Mexico City, Mexico, assignors to Syntex S.A., Mexico City, Mexico, a corporation of Mexico
No Drawing. Filed Nov. 12, 1957, Ser. No. 695,496
2 Claims. (Cl. 260—239.55)

The present invention relates to cyclopentanophenanthrene derivatives and to a process for the production thereof.

More particularly the present invention relates to the novel progestational hormone 4-methyl progesterone and to a process for the production of this compound. The novel final product of the present invention is a progestational hormone having a more favorable biological effect than the known progestational hormone progesterone.

In accordance with the present invention it has been discovered that the novel 4-methyl progesterone may be prepared from the known starting compound, pregnan-3α-ol-20-one which may be converted into its 20-cycloethyleneketal with ethylene glycol. Thereafter oxidation with an oxidizing agent capable of converting secondary hydroxyl groups into keto groups such as chromic acid gave the corresponding 20-ethylenedioxy-pregnane-3-one. When this latter compound is reacted with ethyl formate and sodium hydride there is produced the novel 4-hydroxymethylene derivative i.e. 4-hydroxy-methylene-20-ethylenedioxy-pregnan-3-one and the reaction of this last compound with methyl iodide in the presence of sodium hydride produced the novel 4-methyl-4-aldehydo-20-ethylenedioxy-pregnan-3-one. Treatment of this last compound for a prolonged period of time with alkaline chromatographic type alumina removed carbon dioxide to form the corresponding 20-cycloethyleneketal of 4-methyl-pregnane-3,20-dione which was then hydrolysed in an acid medium to give 4-methyl-pregnane-3,20-dione. In the alternative refluxing in an acid medium of 4-methyl-4-aldehydo-20-ethylenedioxy-pregnan-3-one gave directly although in somewhat lesser yields the 4-methyl-pregnane-3,20-dione. Treatment of the 4-methyl-pregnane-3,20-dione with bromine in acetic acid to add one mol of bromine gave 4-methyl-4-bromo pregnane-3,20-dione and dehydrobromination gave the desired final product 4-methyl-progesterone (4-methyl-Δ4-pregnan-3,20-dione).

The following equation illustrates the process of the present invention:

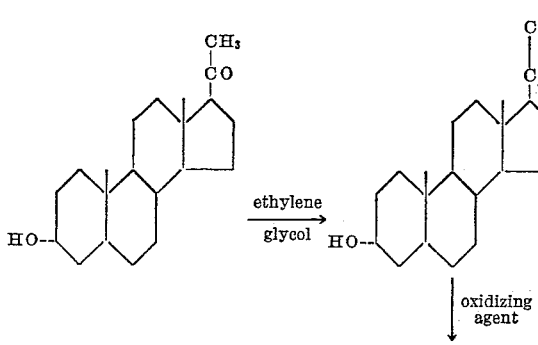

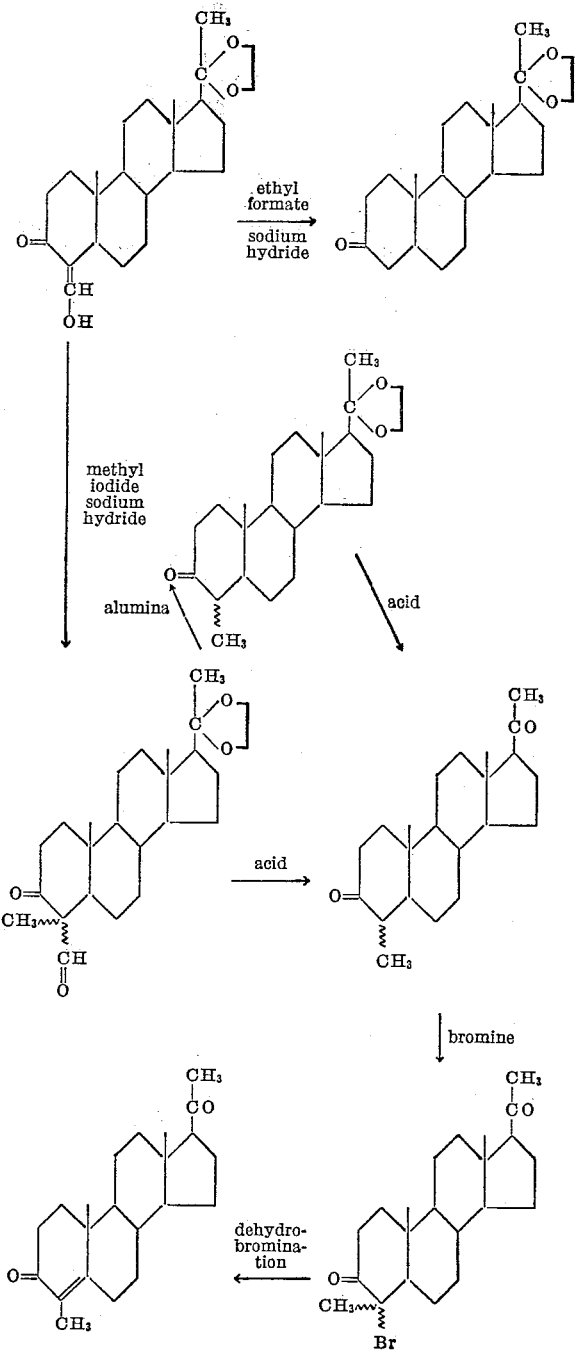

In practicing the process above outlined pregnane-3α-ol-20-one in an organic solvent such as benzene is refluxed for about one day with ethylene glycol in the presence of a small amount of p-toluene-sulfonic acid. Water is continuously removed during the reaction. The resultant compound after separation is 20-ethylenedioxy-pregnan-3α-ol. In the second step of the above outlined process the product obtained in the first step is oxidized with an oxidizing agent capable of oxidizing secondary hydroxyl groups to keto groups, preferably this oxidizing agent is chromic acid in pyridine. The chromic acid in pyridine is first prepared while maintaining a temperature below about 35° C. and then the 20-ethylenedioxy-pregnane-3α-ol is added and the reaction mixture kept below room temperature for approximately one day. Preferably the steroid prior to addition of the chromic acid in pyridine is dissolved in pyridine. The resultant product is the 20-cycloethylene-ketal of pregnane-3,20-dione. The dione thus prepared is then suspended in organic solvent such as benzene and stirred for 3 days under an atmosphere of nitrogen with ethyl formate and sodium hydride. After conventional separation procedures the 4-hydroxy-methylene derivative namely 20-ethylenedioxy-4-hydroxymethylene-pregnane-3-one is obtained. To this last mentioned compound in suspension in an organic solvent such as benzene there has been added methyl iodide and sodium hydride and the mixture refluxed for a period of approximately one day. There is thus prepared the 20-cycloethyleneketal of 4-methyl-4-aldehydo-pregnan-3,20-dione, which upon treatment with activated alumina, lost carbon monoxide to give the 20-cycloethyleneketal of 4-methyl-pregnane-3,20-dione. The ketal group of this last compound could then be hydrolysed with methanolic sulfuric acid or with small amounts of p-toluenesulfonic acid. In the alternative with somewhat lesser yield the 20-cycloethyleneketal of 4-methyl-4-aldehydo-pregnane-3,20-dione could be treated directly with methanolic sulfuric acid to prepare the 4-methyl-pregnane-3,20-dione. Treatment of the 4-methyl-pregnane-3,20-dione with approximately one mol of bromine in acetic acid gave the corresponding 4-bromo derivative and treatment of the 4-bromo derivative with a dehydrohalogenating agent preferably lithium chloride in dimethylformamide solution gave 4-methyl-progesterone.

The following specific examples serve to illustrate but are not intended to limit the present invention.

*Example I*

A mixture of 10 g. of pregnan-3α-ol-20-one, 200 cc. of benzene, 40 cc. of ethyleneglycol previously distilled over potassium hydroxide, and 1.2 g. of p-toluenesulfonic acid was refluxed for 18 hours, with the use of an adapter for the continuous removal of the water formed during the reaction. The solution was neutralized with saturated sodium bicarbonate solution, washed with water until neutral, dried over anhydrous sodium sulfate and evaporated to dryness under reduced pressure. There was thus obtained 20-ethylenedioxy-pregnan-3α-ol.

10 g. of this ketal was dissolved in 70 cc. of anhydrous pyridine and added to a suspension of 10 g. of chromic acid in 70 cc. of pyridine. This suspension had been prepared by adding the powdered chromic acid in 4 portions to the pyridine until disappearance of the dark red color characteristic of chromic acid, while the temperature was maintained below 35° C. by cooling in ice. The reaction mixture was kept for 20 hours at room temperature, diluted with ethyl acetate and filtered through celite. The solution was washed with water until the washings were colorless and then dried over anhydrous sodium sulfate and evaporated to dryness. The residue consisted of the 20-cycloethyleneketal of pregnane-3,20-dione.

A suspension of 10 g. of this ketal in 500 cc. of anhydrous benzene free of thiophene was treated with 10 g. of ethyl formate and 3 g. of sodium hydride and the mixture was stirred for 3 days under an atmosphere of nitrogen. The excess of hydride was decomposed by the cautious addition of 15 cc. of methanol and then 300 cc. of ice water was added. Two layers were formed, of which the aqueous one contained the 4-hydroxymethylene derivative in the form of its sodium salt. The two layers were separated, the aqueous layer was washed with ether and benzene, cooled to a temperature around 5° C. and acidified with aqueous ammonium chloride solution. The product was extracted with methylene dichloride, the solution was evaporated to dryness and the residue crystallized from acetone-hexane, thus producing 20-ethylenedioxy-4-hydroxymethylene-pregnan-3-one.

20 cc. of methyl iodide was added to a suspension of 6 g. of the above compound and 340 mg. of sodium hydride in 100 cc. of benzene and the mixture was refluxed for 20 hours, at the end of which an additional 20 cc. of methyl iodide was added and the refluxing continued to 48 hours. Again 20 cc. of methyl iodide was added and the refluxing was continued to a total of 72 hours. The cooled solution was washed with 1% sodium hydroxide solution to remove traces of unreacted 20-ethylenedioxy-4-hydroxymethylene-pregnan-3-one and the organic phase was evaporated to dryness under reduced pressure. The residue was crystallized from acetone-hexane, thus giving the 20-cycloethyleneketal of 4-methyl-4-aldehydro-pregnane-3,20-dione.

2 g. of the above compound was dissolved in benzene and transferred to a column of 200 g. of alkaline activated alumina (alkali washed chromatographic type). After 24 hours the column was eluted with ethyl acetate and the eluate was crystallized from acetone-hexane. There was thus obtained the 20-cyclo-ethyleneketal of 4-methylpregnane-3,20-dione.

1.5 g. of such 20-cycloethyleneketal was dissolved in 75 cc. of methanol and mixed with 7.5 cc. of 8% sulfuric acid. The solution was refluxed for 50 minutes, cooled and diluted with water. The methanol was removed by distillation under reduced pressure and the residue was neutralized with sodium bicarbonate and extracted with chloroform. The chloroform extract was washed with water to neutral, dried over anhydrous sodium sulfate and evaporated to dryness. Crystallization of the residue from acetone-hexane afforded 4-methyl-pregnane-3,20-dione.

Alternatively, the ketal group can be hydrolyzed by treatment of the acetone solution of 4-methyl-20-ethylenedioxy-pregnan-3-one with small amount of p-toluenesulfonic acid at room temperature.

*Example II*

1.5 g. of the 20-cycloethyleneketal of 4-methyl-4-aldehydro-pregnane-3,20-dione was dissolved in 75 cc. of methanol and then treated with sulfuric acid by the method described in the previous example. There was thus obtained 4-methyl-pregnane-3,20-dione, identical to the one obtained by the method described in Example I.

*Example III*

1.4 g. of the 4-methyl-pregnane-3,20-dione, obtained in accordance with any of the previous examples, was dissolved in 80 cc. of acetic acid, mixed with a few drops of a solution of hydrogen bromide in acetic acid and then treated at room temperature with a solution of 0.74 g. (1.1 molar equivalents) of bromine in 20 cc. of acetic acid, which was added dropwise under continuous stirring. The mixture was allowed to stand until the almost complete decoloration of the reaction mixture indicated the absorption of bromine (around 20 minutes) and then poured into water. The precipitate was collected by filtration, washed with water and air dried, thus producing 4-methyl-4-bromo-pregnane-3,20-dione.

Without further purification, the bromo compound was dissolved in 30 cc. of dimethylformamide and then mixed with 550 mg. of magnesium carbonate and 275 mg. of lithium chloride. The mixture was stirred for 2 hours while the temperature was maintained at 85–90° C. After being allowed to cool it was poured into 200 cc. of cold water containing 1 cc. of concentrated hydrochloric acid. The precipitate formed was collected, washed with water and dried. Chromatography of the product in a column of neutral alumina yielded the desired 4-methyl-progesterone in pure form.

We claim:
1. 4-hydroxymethylene - 20 - ethylenedioxy-pregnan-3-one.
2. 4-methyl-4-aldehydo - 20 - ethylenedioxy-pregnan-3-one.

References Cited in the file of this patent

UNITED STATES PATENTS

| | | | |
|---|---|---|---|
| 2,239,742 | Serini et al. | | Apr. 29, 1941 |
| 2,732,385 | Krsek | | Jan. 24, 1956 |
| 2,824,871 | Levin | | Feb. 25, 1958 |

FOREIGN PATENTS

| | | | |
|---|---|---|---|
| 736,817 | Great Britain | | Sept. 14, 1955 |

OTHER REFERENCES

J. Chem. Soc. (1954), article by Daglish et al., pages 2627–33, relied on.